United States Patent
Tadayyon et al.

(10) Patent No.: US 7,443,911 B2
(45) Date of Patent: Oct. 28, 2008

(54) COMMUNICATION DEVICES CAPABLE OF USING SYSTEM CLOCK INPUTS FOR EMBEDDED TELEVISION APPLICATIONS

(75) Inventors: Shahram Tadayyon, Austin, TX (US); James M. Nohrden, Lakeway, TX (US); James Ting-Yu Kao, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 635 days.

(21) Appl. No.: 10/875,863

(22) Filed: Jun. 24, 2004

(65) Prior Publication Data

US 2005/0226314 A1  Oct. 13, 2005

Related U.S. Application Data

(60) Provisional application No. 60/560,042, filed on Apr. 7, 2004.

(51) Int. Cl.
*H04B 1/38* (2006.01)
(52) U.S. Cl. ............... 375/222; 375/219; 725/111
(58) Field of Classification Search ........... 375/223, 375/222, 219, 22; D14/242; 455/557; 725/111
See application file for complete search history.

(56) References Cited

U.S. PATENT DOCUMENTS

| | | | | |
|---|---|---|---|---|
| 5,655,009 | A * | 8/1997 | Arai et al. | 379/93.28 |
| 5,761,463 | A * | 6/1998 | Allen | 710/305 |
| 6,212,566 | B1 * | 4/2001 | Vanhoof et al. | 709/230 |
| 6,304,597 | B1 * | 10/2001 | Dupuis et al. | 375/222 |
| 2001/0030959 | A1 * | 10/2001 | Ozawa et al. | 370/386 |
| 2002/0159130 | A1 * | 10/2002 | Sakano et al. | 359/326 |
| 2004/0071029 | A1 * | 4/2004 | Sutardja | 365/211 |

OTHER PUBLICATIONS

"Si2400" Silicon Laboratories. "Si2400: V.22BIS ISOmodem with Integrated Global DAA" Rev. 0.95. 2000.*
"Si3016" Silicon Laboratories—Products. http://www.silabs.com/products/wireline/si3016.asp. 2004.
Silicon Laboratories Si2041 ISOmodem™ Product Brief. Mar. 2003.
Silicon Laboratories ISOmodem™ Solutions Product Brief. Jul. 2003.
Conexant, "SCXV.92/v.34/V.32bis Modem—Controller-based Modem with Worldwide Smart DAA 3 Line Side Device for Embedded Applications" Product Preview. Feb. 19, 2004.
Conexant, "SCXV.92/v.34/V.32bis Modem—CX86500" Product Preview. 2003, 2004.

* cited by examiner

*Primary Examiner*—Shuwang Liu
*Assistant Examiner*—James M Perez
(74) *Attorney, Agent, or Firm*—Trop, Pruner & Hu, P.C.

(57) ABSTRACT

According to one embodiment of the present invention, a device may receive one of multiple frequencies at a clock input of the device; determine which of the multiple frequencies is received; and generate at least one internal clock frequency for operation of the device using the received frequency. For example, such a device may be embedded within a system having a receiver to receive a satellite signal spectrum and to tune a signal channel and baseband circuitry coupled to the receiver to process digital data corresponding to the signal channel, where the baseband circuitry operates at the frequency provided to the device.

18 Claims, 5 Drawing Sheets

COMMUNICATION DEVICES CAPABLE OF USING SYSTEM CLOCK INPUTS FOR EMBEDDED TELEVISION APPLICATIONS

REFERENCE TO EARLIER APPLICATION

This application claims priority to U.S. Provisional Patent Application Ser. No. 60/560,042, filed Apr. 7, 2004, entitled "Communication Devices Capable of Using System Clock Inputs for Embedded Television Applications" by Shahram John Tadayyon, James M. Nohrden and James Ting-Yu Kao.

TECHNICAL FIELD OF THE INVENTION

This invention relates to clock inputs for communication systems, and more particularly to clock inputs for communication devices within digital television systems, such as set-top boxes.

BACKGROUND

Set-top boxes, digital video recorders, and other digital television products typically have a built-in 27 megahertz (MHz) system clock. Currently, communication devices embedded within such digital television systems use external crystals or clock inputs that are specific to the internal clock requirements of the communication device. These techniques do not implement an internal clock generator to specifically use a 27 MHz clock input. For example, the $2^{nd}$ generation ISOmodem device embodiment depicted in FIG. 1 requires a fixed 4.9152 MHz clock input. As shown in FIG. 1, modem device 10 includes a clock interface 15 and phase-locked loop (PLL) and clock generation circuitry (collectively "PLL/clock generator") 20.

SUMMARY OF THE INVENTION

The present invention provides a communication device for digital television systems capable of using a standard system clock input. Set-top boxes, digital video recorders, and other digital television products typically have a built-in 27 MHz system clock. This 27 MHz system clock can be used as a clock input to a communication device, such as a modem, which reduces the bill of materials by eliminating the need for a separate external crystal, resulting in advantageous size and costs savings. In one embodiment, a communication device may be adapted to receive a system clock frequency of a system or a reference clock frequency and use either one to generate one or more internal clock frequencies. The input frequencies may be received via a clock input in such an embodiment.

In operation, a device in accordance with an embodiment of the present invention may receive one of multiple frequencies at a clock input; determine which of the multiple frequencies is received; and generate at least one internal clock frequency for operation of the device using the received frequency. For example, such a device may be embedded within a system having a receiver to receive a satellite signal spectrum and to tune a signal channel and baseband circuitry coupled to the receiver to process digital data corresponding to the signal channel, where the baseband circuitry operates at the frequency provided to the device.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

The present invention provides a communication device for digital television systems capable of using a standard system clock input. Set-top boxes, digital video recorders, and other digital television products typically have a built-in 27 MHz system clock. This 27 MHz system clock can be used as a clock input to a communication device, such as a modem, which reduces the bill of materials.

As disclosed herein, a 27 MHz clock input option is added to a communication device to generate the internal clocking signals required for proper operation. The choice of 27 MHz as the clock frequency is significant because it is the system clock used in many digital video applications.

In a modem, either a crystal oscillator or a clock input pin, e.g., a CLKIN or XTALI pin, is typically used to form the basis of the internal clocks. An external crystal oscillator is a significant cost in building a complete modem solution. Having a 27 MHz option, therefore, can help eliminate the need for these components, typically a crystal and two capacitors.

Figure 1:
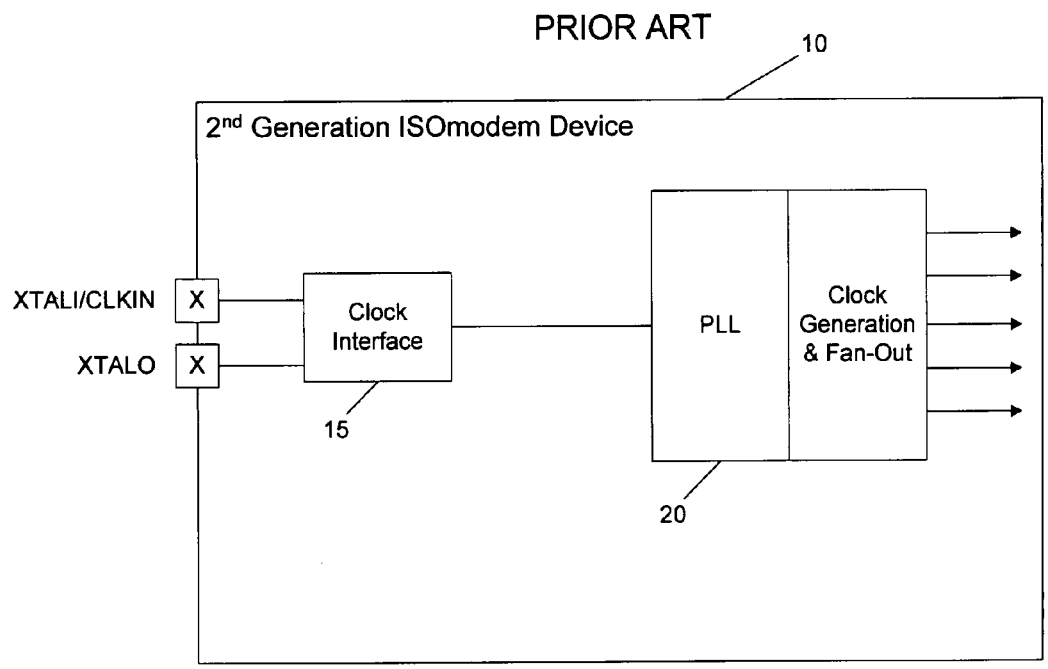
FIG. 1 (Prior Art) is a block diagram for a second generation modem device capable of using only a 4.9152 MHz clock input.
Figure 2:
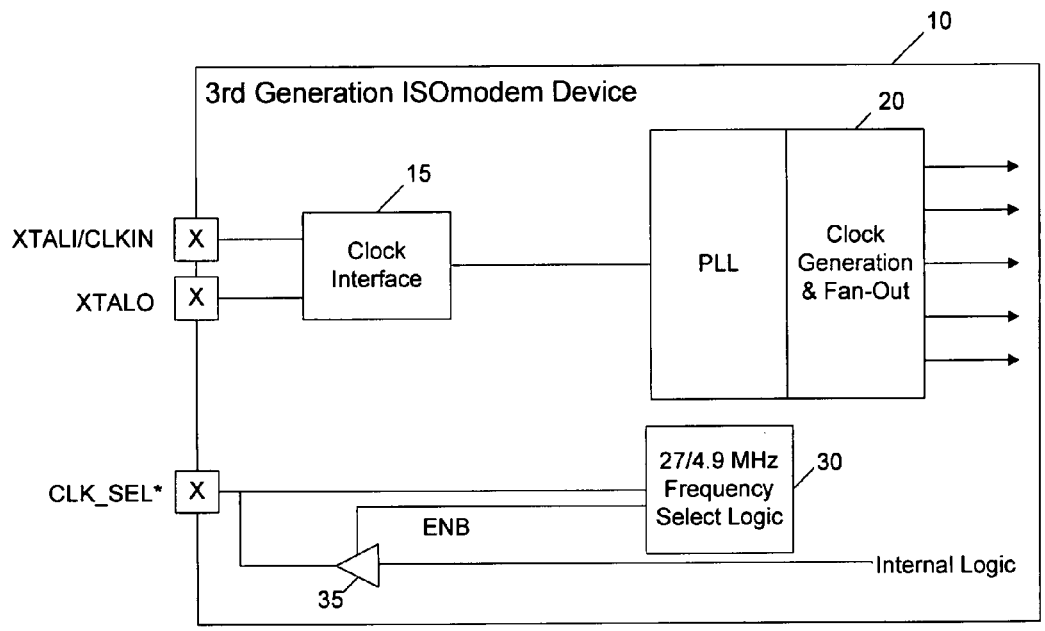
FIG. 2 is a block diagram for a third generation modem device, according to the present invention, capable of using a 4.9152 MHz clock input or a standard 27 MHz system clock input.

Referring now to FIG. 2, shown is a block diagram of a third generation modem device in accordance with an embodiment of the present invention. As shown in FIG. 2, the CLKIN or XTALI/XTALO signals pass through a crystal interface to provide a clean clocking input. This clocking input is sent to an internal phase-locked loop (PLL), which generates the internal system clocks used to drive various functions of the modem such as a digital signal processor (DSP), controller, and memory. In various embodiments, regardless of the input frequency, the internal clocks may be generated at fixed frequencies. One or more of these clocks can also be buffered and output to drive other devices. In one embodiment, a clock output signal from modem device 10 (not shown in FIG. 2) may be used by a codec coupled thereto, for example, a voice codec or the like.

Different implementations of the present invention are possible. For example, the 27 MHz clock input can provide the sole clocking frequency option, or the 27 MHz clock input can be one of many different frequency input options. For proper device operation, it is typically important that the modem correctly determine the CLKIN frequency that is provided. One method for making this determination is to change the state of an input/output (I/O) pin. Upon power up or reset, the logic state of one or more pins may be used to select the CLKIN frequency. For example, a low power-on state of a clock select (CLK_SEL) pin can be used to set the modem for a 27 MHz input, whereas a high power-on state sets the modem for a 4.9152 MHz (generically, a 4.9 MHz input) input. This information is fed to the PLL, which appropriately adjusts the internal clock generation circuit. An external resistor on the CLK_SEL pin may be used to set the logic state high or low at power-on.

As shown in FIG. 2, modem device 10 may include a clock interface 15 which is coupled to PLL/clock generator 20. As described above, clock interface 15 may be used to receive a given clocking input, which may be at one of multiple frequencies (e.g., a 4.9 MHz input or a 27 MHz input). After clock interface 15 filters the clocking input, it may be provided to PLL/clock generator 20 for generation of one or more internal system clocks for use in modem device 10. In various embodiments, PLL/clock generator 20 may include a fractional-N PLL to appropriately divide a system clock frequency, such as a 27 MHz clock, into desired internal clock frequencies.

Also shown in FIG. 2 is frequency selection logic 30, which may be used to select which of multiple possible input frequencies is being input into modem device 10. In one embodiment, logic 30 may include logic functionality such as logic gates to analyze the CLK_SEL pin. In other embodiments, logic 30 may include a combination of hardware, software and/or firmware to analyze an incoming signal. Accordingly, logic 30 may be coupled to PLL/clock generator 20 to provide information regarding the given input frequency. In certain embodiments, on power-on or reset of a system including modem device 10, logic 30 may analyze the power-on state of the CLK_SEL pin to determine what frequency is being provided to modem device 10. As discussed above, in one embodiment a high power-on state may set the modem for a 4.9 MHz input while a low power-on state may set the modem for a 27 MHz input, or vice versa in other embodiments.

A further refinement, usable with the present invention, is to utilize a logic output signal as the clock selection input. The internal clock selection logic can be so equipped as to be able to force the internal logic output signal into a high-impedance state so that the external pull-up/down resistor can be detected. This technique allows a single pin to be used as a logic output in one mode of operation and as a clock selection input in another mode of operation.

As shown in FIG. 2, modem device 10 may also include a driver 35 to provide internal logic signals out of modem device 10 on the CLK_SEL pin. In one embodiment, an enable (ENB) signal from logic 30 may cause driver 35 to force the output of driver 35 into a high-impedance state during power-on or reset. Then, after the input frequency has been detected, the signal may enable driver 35 to be used as a normal logic output signal.

In one embodiment, logic 30 may analyze an input on the CLK_SEL pin for a first portion of a power-on or reset state, for example, 100 milliseconds to determine the incoming clock frequency and provide the desired information to PLL/clock generator 20. Then, the high-impedance level may be removed from driver 35 to allow the CLK_SEL pin to be used as a logic output pin. For example, in one embodiment the CLK_SEL pin may also be used to output a data carrier detect (DCD) signal.

Figure 3:
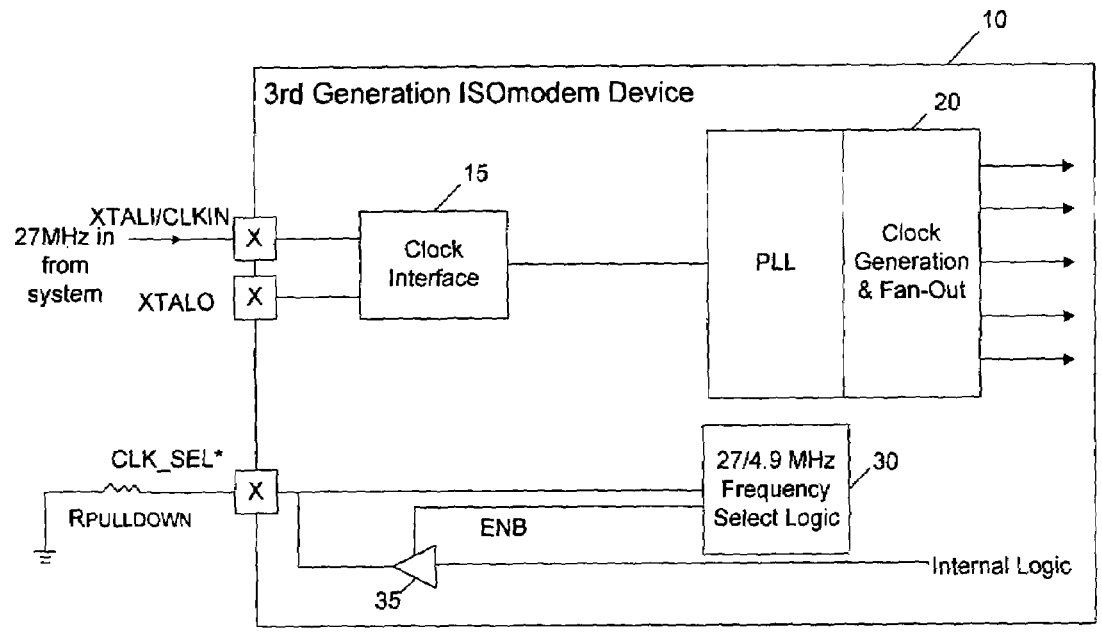
FIG. 3 is a block diagram for a third generation modem device, according to the present invention, that has been configured to accept the standard 27 MHz system clock input.
Figure 4:
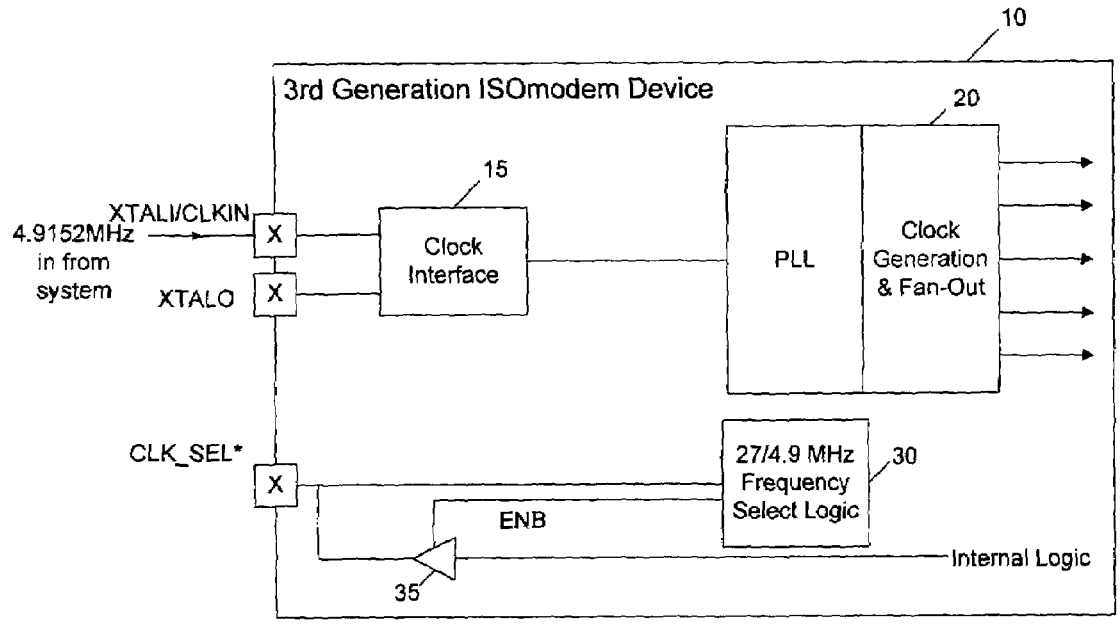
FIG. 4 is a block diagram for a third generation modem device, according to the present invention, that has been configured to accept a 4.9152 MHz clock input.
Figure 5:
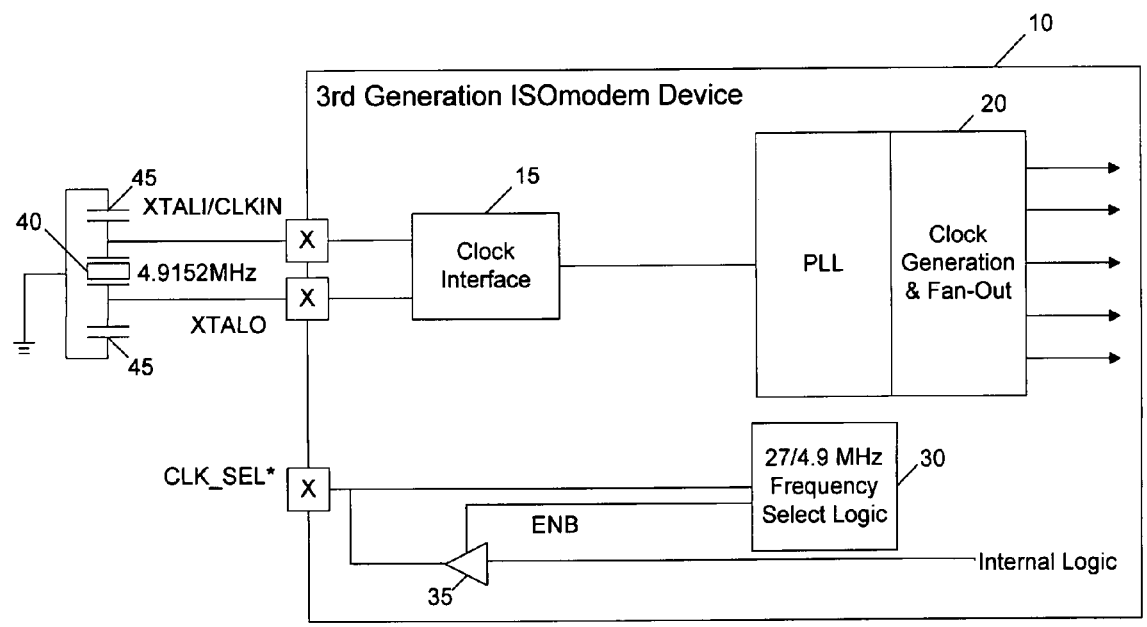
FIG. 5 is a block diagram for a third generation modem device, according to the present invention, configured to use a 4.9152 MHz clock input from a crystal oscillator.

As used in the FIGURES, like reference numerals may be used to refer to similar components within the different embodiments shown. FIGS. 3-5 provide additional example embodiments. FIG. 3 provides an example embodiment where a 27 MHz system clock signal is used, and a resistor ($R_{PULLDOWN}$) couples the clock select pin to ground to indicate clock selection, as discussed above. FIG. 4 provides an example embodiment where a typical 4.9152 MHz input clock signal is used, and the clock select pin is left floating (or could be coupled to a logic high voltage through a resistor) to indicate clock selection, as discussed above. In one embodiment, if left floating, an internal resistor within modem device 10 may pull the CLK_SEL pin to a high power-on state to indicate clock selection.

FIG. 5 provides an example embodiment where a crystal oscillator is used to provide the 4.9152 MHz input clock signal. As shown in FIG. 5, a crystal 40 may be a 4.9152 MHz crystal, to which is coupled a pair of capacitors 45. As further shown, nodes between crystal 40 and each of capacitors 45 may be coupled to the XTALI/CLKIN pin and XTALO pin.

It is further noted that the present invention could be applied to any communications device including but not limited to analog modems, cable modems, and DSL modems. This invention could easily address a 13.5 MHz clock frequency as well, or any other standard system clock signal utilized by other devices in a system environment. (For example, certain video applications divide the 27 MHz frequency by two when distributing the signal across the system, and distributing a lower frequency clock may enhance signal integrity.) Other frequencies can be supported via simple modifications to the clock generation circuitry, PLL, etc. More than two input frequencies can be supported by providing an expanded frequency selection capability such as using multiple CLK_SEL pins. As discussed above, other methods could be used, if desired, to select one of a given number of frequencies.

For example, in other embodiments, instead of receiving a signal indicative of a clock frequency being input into modem device 10, a modem in accordance with an embodiment of the present invention may automatically detect the frequency being input. For example, in one embodiment hardware present and coupled between the CLKIN pin and clock interface 15 may determine the frequency being input. Such hardware may be a frequency detector, for example. This information may then be provided to PLL/clock generator 20, in certain embodiments.

In certain embodiments, determining an incoming clock frequency may be effected using software (or a combination of software, firmware and hardware) that may be executed within a system, such as a receiver, set-top box, DVR, or the like. For example, in the embodiment of FIG. 2, such software may be implemented within logic 30. Such embodiments may include an article in the form of a machine-accessible storage medium onto which there are stored instructions and data that form a software program to perform such methods of determining an incoming frequency.

Figure 6:
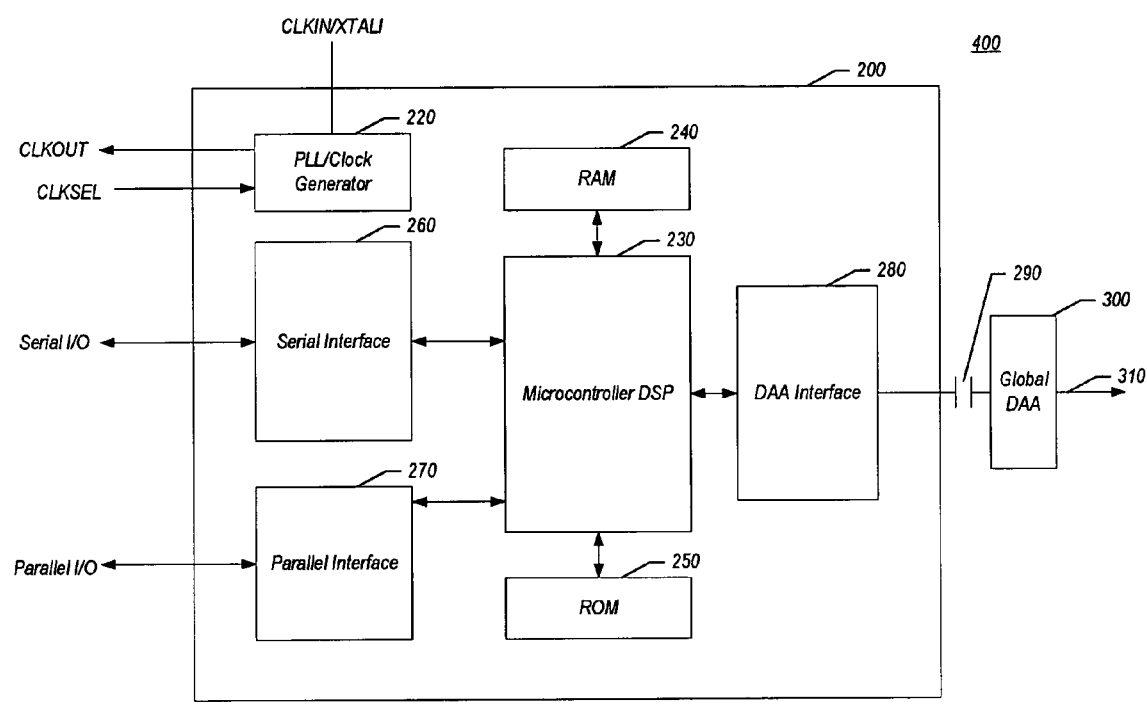
FIG. 6 is a block diagram of a modem device in accordance with one embodiment of the present invention.

Referring now to FIG. 6, shown is a modem 400 that is formed of a two chip modem solution, namely a system-side device, i.e., a modem device 200 and a line-side device, i.e., a global direct access arrangement (DAA) chip 300. As shown in FIG. 6, modem device 200 and DAA 300 may be coupled by a capacitive isolation 290. Modem device 200 may be a system-side chip that includes modem DSP circuitry, and DAA 300 may be a line-side chip that attaches to a phone line, for example, line 310. In various embodiments, modem 400 may be an embedded modem for use in various systems, such as set-top boxes, electronic point-of-sale devices, digital video recorders, digital television, remote monitoring, and ATM terminals, for example.

As shown in FIG. 6, modem device 200 may include PLL/clock generation circuitry 220. Such PLL/clock generation circuitry 220 may be similar to that described above with reference to FIGS. 2-5. Accordingly, the circuitry may receive an input clock via a CLKIN/XTALI pin. As discussed above, such input frequency may be at one of a different number of different frequencies, depending upon the system within which the embedded modem is present.

Shown in FIG. 6 are representative components that may be within modem device 200. These components may be operated using different internal clock frequencies generated by PLL/clock generation circuitry 220. As shown in FIG. 6, components may include a microcontroller DSP 230 which is coupled to different memories, including a random access memory (RAM) 240 and a read-only memory (ROM) 250. Furthermore, DSP 230 may be coupled to a DAA interface 280 to provide an interface to global DAA 300. Also, DSP 230 may be coupled to a serial interface 260, which may be used to interface with various system components via a serial I/O port. DSP 230 may also be coupled to a parallel interface 270 for interfacing with parallel components within a system via a parallel I/O port.

Figure 7:
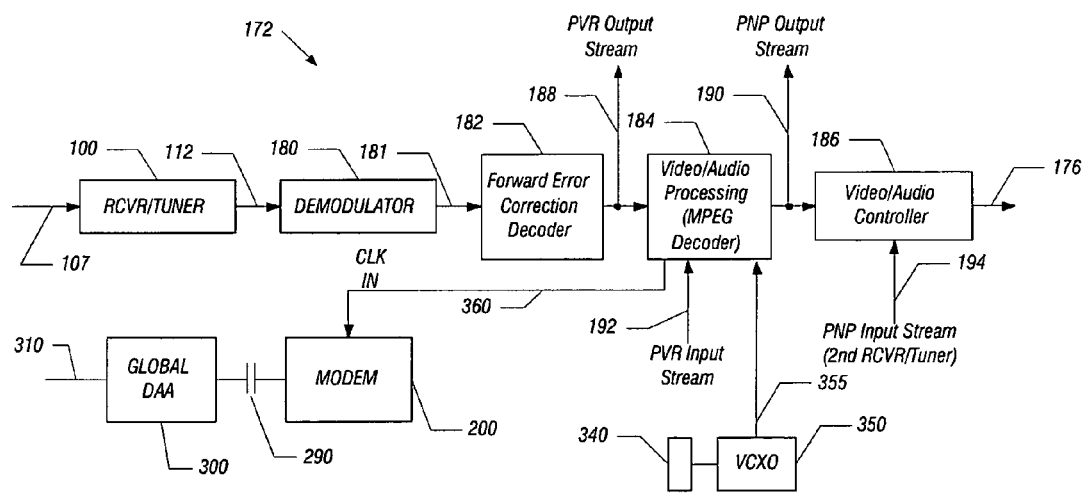
FIG. 7 is a block diagram of a system in accordance with one embodiment of the present invention that includes an embedded modem capable of operating at different clock frequencies.

FIG. 7 is a block diagram of a portion of a system embedding a modem in accordance with one embodiment of the present invention. As shown in FIG. 7, circuitry for a satellite set-top box 172 includes a modem device 200 in accordance with one embodiment of the present invention. The input signal spectrum 107 can be, for example, 32 transponder channels between 950 MHz and 2150 MHz with each transponder channel carrying a number of different program channels. This signal spectrum 107 can be processed by the receiver/tuner 100 to provide digital baseband output signals 112 that represent a tuned transponder channel. These output signals 112 can then be processed by a demodulator 180 that can tune one of the program channels within the tuned transponder channel.

The output signal 181 from the demodulator, which represents a tuned program channel within the transponder channel that was tuned by the receiver/tuner 100, can then be processed with a forward error correction decoder 182 to produce a digital output stream. This digital output stream is typically the data stream that is stored by personal video recorders (PVRs) for later use and viewing by a user, as represented by the PVR output stream 188.

The output of the decoder 182, or the stored PVR data as represented by PVR input stream 192, can then be processed by video/audio processing circuitry 184 that can include processing circuitry such as an MPEG decoder. The output of the processing circuitry 184 is typically the digital video data stream that represents the program channel and is used for picture-in-picture (PnP) operations, for example, where the set-top box circuitry 172 includes two tuners with one tuner providing the primary viewing feed and a second tuner providing the PnP viewing feed. The output of the processing circuitry 184, as well as a PnP input stream 194 from a second tuner if a second tuner is being utilized for PnP operations, can be processed by a video/audio controller 186 to generate a video output signal 176 that can subsequently be utilized, for example, with a TV or VCR. Additional tuners could also be used, if desired.

Still referring to FIG. 7, a crystal oscillator 340, which may be a 13.5 MHz crystal, is coupled to a voltage controlled crystal oscillator (VCXO) 350. Using a control voltage, VCXO 350 may convert the 13.5 MHz frequency into a desired frequency, for example a 27 MHz system clock frequency. The output of VCXO 350 may be coupled via line 355 to video/audio processing circuitry 184. Within processing circuitry 184 the system clock may be conditioned and provided via line 360 to an input of modem device 200, e.g., a CLKIN pin. In one embodiment, line 360 may provide the clock input at a system clock frequency (e.g., 27 MHz), although the scope of the present invention is not so limited.

While shown as including a separate crystal and VCXO, in other embodiments, baseband circuitry, such as processing circuitry 184, may independently generate a system clock frequency that is provided to modem device 200.

Further, while shown in the embodiment of FIG. 7 as receiving a clock input from processing circuitry 184, in other embodiments, modem device 200 may receive an input clock frequency directly from a crystal oscillator, such as crystal 340, a VCXO, such as VCXO 350, or other circuitry within system 172. Further, while described herein as receiving a system clock frequency of 27 MHz, it is to be understood that the scope of the present invention is not so limited, and in other embodiments a different such frequency may be used as an input to modem 200.

As further shown in FIG. 7, modem device 200 may be coupled via a capacitive isolation 290 to a global DAA 300, which in turn may be coupled to a phone line 310, for example. While shown with a capacitive isolation, in other embodiments, modem device 200 and global DAA 300 may be coupled via a digital isolation barrier, a transformer, or the like.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    a communication device having a first pin to receive a system clock frequency of a system and a second pin which, in connection with the first pin, is to receive a reference clock frequency or a system clock frequency from a crystal oscillator coupled to the communication device;
    a clock interface coupled to the first and second pins to receive the system clock frequency or the reference clock frequency;
    a phase-locked loop coupled to the clock interface to provide a plurality of internal clocks to drive multiple components of the communication device from the system clock frequency or the reference clock frequency;
    logic coupled to the phase-locked loop to control the phase-locked loop based on which one of the system clock frequency and the reference clock frequency is input into the communication device, wherein the logic is coupled to receive and analyze a clock selection input signal received in the apparatus during a first portion of a power on or reset state of the apparatus and to exclusively select the system clock frequency or the reference clock frequency based on a value of the clock selection input signal; and
    wherein an interconnect of the communication device is shared between the clock selection input signal and an output logic signal; and a driver is coupled to the interconnect, wherein the logic is to cause an output of the driver into a high-impedance state during the power on or reset state.

2. The apparatus of claim 1, further comprising an impedance coupled to the communication device to provide the clock selection input signal.

3. The apparatus of claim 1, wherein the communication device comprises a modem housed with the system, the system comprising a digital television device.

4. The apparatus of claim 1, wherein the system clock frequency comprises a frequency substantially at 27 megahertz.

5. The apparatus of claim 1, wherein the communication device comprises a direct access arrangement modem.

6. The apparatus of claim 5, wherein the direct access arrangement modem comprises a line-side device and a system-side device, wherein system-side device is coupled to receive the system clock frequency or the reference clock frequency.

7. The apparatus of claim 1, wherein the system clock frequency is a clock used by the system.

8. The apparatus of claim 1, wherein the logic includes a frequency detector to detect which of the system clock frequency and the reference clock frequency is input.

9. The apparatus of claim 1, wherein the driver is to thereafter output a data carrier detect signal.

10. The apparatus of claim 1, wherein the plurality of internal clocks are each at a fixed frequency regardless of whether the system clock frequency or the reference clock frequency is input into the communication device.

11. A modem comprising:
a clock generation circuit to generate at least one internal clock frequency exclusively selecting a first frequency or a second frequency obtained via a clock input, responsive to a control signal received during a power on or reset state via a second input of the modem;
wherein said control signal is indicative of which of the first frequency and the second frequency is input into the clock generation circuit, the first frequency corresponding to a system clock signal of a video device and the second frequency corresponding to a crystal frequency;
a frequency selection logic coupled to the clock generation circuit to indicate which of the first frequency or the second frequency is input to said clock input, responsive to said control signal; and
a driver coupled to the second input to provide a logic output signal after the control signal is received, wherein an output of the driver is placed into a high-impedance state during the power on or reset state by said logic.

12. The modem of claim 11, wherein the modem comprises a line-side device and a system-side device, wherein system-side device is coupled to receive the first frequency or the second frequency.

13. The modem of claim 11, wherein the modem is housed within the video device.

14. The modem of claim 11, wherein the first frequency comprises a frequency substantially at 27 megahertz.

15. A system comprising:
a receiver to receive a satellite signal spectrum and to tune a signal channel;
baseband circuitry coupled to the receiver to process digital data corresponding to the signal channel, the baseband circuitry to operate at a system clock frequency; and
a communication device coupled to the baseband circuitry having a clock generation circuit including a clock interface to receive the system clock frequency or a second clock frequency on a common pin, the clock generation circuit further including a phase-locked loop coupled to the clock interface to generate a plurality of internal clocks each at a fixed frequency regardless of whether the second clock frequency or the system clock frequency is received, the plurality of internal clocks to drive multiple components of the communication device, logic coupled to the phase-locked loop to exclusively select the system clock frequency or the second clock frequency for use in the communication device based on a control signal received on an interconnect, and a driver coupled to the interconnect, wherein the logic is to cause an output of the driver into a high-impedance state during a power on or reset state, and the driver is to thereafter output a data carrier detect signal.

16. The system of claim 15, wherein the communication device comprises a modem housed with the system, the system comprising a digital television device.

17. The system of claim 15, wherein the communication device comprises a modem having a line-side device and a system-side device, the system-side device to receive the system clock frequency or the second clock frequency.

18. The system of claim 15, wherein the logic includes a frequency detector to detect which of the system clock frequency and the second clock frequency is input.

* * * * *